(12) United States Patent
Cote et al.

(10) Patent No.: US 10,586,060 B2
(45) Date of Patent: Mar. 10, 2020

(54) DEVICE FOR SECURELY TRANSMITTING AND STORING DATA

(71) Applicants: Justin Cote, Hazlet, NJ (US); August Culbert, Oceanport, NJ (US)

(72) Inventors: Justin Cote, Hazlet, NJ (US); August Culbert, Oceanport, NJ (US)

( * ) Notice: Subject to any disclaimer, the term of this patent is extended or adjusted under 35 U.S.C. 154(b) by 147 days.

(21) Appl. No.: 15/159,303

(22) Filed: May 19, 2016

(65) Prior Publication Data
US 2017/0339149 A1    Nov. 23, 2017

(51) Int. Cl.
*G06F 21/60* (2013.01)
*H04L 29/06* (2006.01)
*G06F 21/64* (2013.01)

(52) U.S. Cl.
CPC .......... *G06F 21/606* (2013.01); *G06F 21/64* (2013.01); *H04L 63/10* (2013.01); *H04L 63/123* (2013.01)

(58) Field of Classification Search
CPC .............................. H04L 63/10; H04L 63/123
See application file for complete search history.

(56) References Cited

U.S. PATENT DOCUMENTS

| | | | | |
|---|---|---|---|---|
| 5,703,562 A * | 12/1997 | Nilsen | ................ | G06F 11/1625 340/286.02 |
| 6,438,638 B1 * | 8/2002 | Jones | ................ | G06F 13/38 710/301 |
| 8,250,235 B2 * | 8/2012 | Harvey | ................ | H04L 63/105 709/215 |
| 8,838,868 B2 * | 9/2014 | Tippett | ................ | G06F 13/20 439/38 |
| 9,584,521 B2 * | 2/2017 | Frenkel | ................ | H04L 63/10 |
| 2007/0147641 A1 * | 6/2007 | Platz | ................ | H04R 25/558 381/315 |
| 2012/0017079 A1 * | 1/2012 | Mraz | ................ | H04L 9/3236 713/153 |
| 2015/0134862 A1 * | 5/2015 | Sthoeger | ................ | G06F 13/4291 710/105 |

* cited by examiner

*Primary Examiner* — Robert B Leung
*Assistant Examiner* — Carlos M De Jesus Lassala
(74) *Attorney, Agent, or Firm* — Stone Law, P.C.; Jason D. Stone

(57) ABSTRACT

Disclosed in a device for the secure transmission and storage of data. The device for information to be securely stored on a storage device. A first data processing device is connected using a unidirectional link to a second data processing device. The first data processing device is given information from an external source, which is then transmitted using said unidirectional link. The first data processing transmits data to the second data processing device, which in turn stores the data either internally or externally on the storage device. The second data processing device optionally signals a user if the transmission was successful.

2 Claims, 4 Drawing Sheets

DEVICE FOR SECURELY TRANSMITTING AND STORING DATA

BACKGROUND

Computer security is a field of ever increasing need. New advances in technology are countered with new methods to gain access to confidential information. Companies and individual users need to place safeguards in place or the risk of some sort of data theft is too high. Data security is one of the most important components of computer security. Every day large amounts of confidential information are put onto computer systems which if left unprotected poses a great risk to the owner of that confidential information. Many systems are targeted at large companies rather than smaller companies or individual users. Other systems are targeted at smaller companies and do not scale well to larger companies. Each system in place suffers from one or more of the following disadvantages: complex implementation, high cost, inherent security holes, and physical restrictions on use.

For the foregoing reasons, there is a need for a more secure data storage device.

SUMMARY

The present invention is directed to a device for storing data utilizing a unidirectional link. An embodiment of the system includes a first and a second device for processing information. Said first device interfaces with a general purpose computing system and receives information from the computing system. The first processing device connects to the second processing device through a unidirectional connection. The computing system sends data to the first processing device which in turn sends the information to the second processing device to store the information. Optionally, in conjunction with the data a first hash is created uniquely identify the data to be transmitted; this hash is transmitted through the unidirectional connection to the second processing device. Upon receipt of the data and the first hash the second processing device calculates a second hash for the data received. The first hash and the second hash are compared and the second unit indicates whether the hashes match to a user or potentially communicates back to the first processing device through a very low speed data link. If the first hash and the second hash, the hashes, match the data is assumed to have transmitted correctly, if the hashes do not match the data needs to be retransmitted. An alternate embodiment includes a simple electrical contact to signify success between the first unit and the second unit. Another alternate embodiment includes a very low speed data link between the first unit and the second unit, said very low speed data link is implemented to limit the speed at which information may be transmitted to a speed which will make it impractical to transmit more than a few bits of data during an observable period; said very low speed data link may be electrically or wireless created. The one-way device allows for a computer to send information via a unidirectional link to a storage device. The unidirectional link only allows information to flow in one direction and therefore requires an additional data pathway in order for the information to be taken off of the storage device. The unidirectional link is designed in such a way that physical access to the storage device is required in order to get information from it. In some embodiments of the invention a physical interlock exists which allows a user to move a switch or a key in order to create a bidirectional link between the first device and the second device thereby allowing transmission of information from the storage device.

An embodiment of the system wherein the base-station further comprises a screen and a human interface device which allows for the system to be used without a general purpose computer.

Another embodiment of the system wherein the identification module further comprises a hardware token which allows identification of an individual student.

Another embodiment of the system wherein the connector to the transmitting computer is a USB connector.

Another embodiment of the system wherein the connector to the transmitting computer is capable of utilizing the eSATA protocol.

Another embodiment of the system wherein the communications modules are based on WiFi technology in the first device.

Another embodiment of the system wherein the communications modules are based on Bluetooth technology in the first device.

Another embodiment of the system wherein the communications modules are based on Radio Frequency technology in the first device.

Another embodiment of the system wherein the connector to the transmitting computer is a fibre channel connector.

Another embodiment of the system wherein the connector to the transmitting computer is capable of utilizing the iSCSI protocol.

Another embodiment of the system wherein the connector to the transmitting computer is an Ethernet connector.

BRIEF DESCRIPTION OF DRAWINGS

The accompanying drawings, which are incorporated in and constitute a part of the specification, illustrate a presently preferred embodiment and a presently preferred method of the invention. These drawings, together with the general description given above and the detailed description of the preferred embodiment and method given below, serve to explain the principles of the invention.

Preferably the first and second processing devices are electronically isolated from each other. The electronic isolation provides further security by removing a potential interface between the two processing devices. Preferably the second processing device is connected to a display device which can alert a user to the status of a transfer.

In one alternative embodiment the first and second processing devices are combined on a single circuit board.

In another alternative embodiment the second processing device display device is constructed of Light Emitting Diodes (LEDs).

In another alternative embodiment, the first processing unit has a display and a very low speed electrical link connects the first and second processing device.

In another alternative embodiment, the first processing unit has a display and a simple electrical contact connects the first and second processing device.

In another alternative embodiment the first and second processing devices are constructed using general purpose computing hardware.

Figure 1:
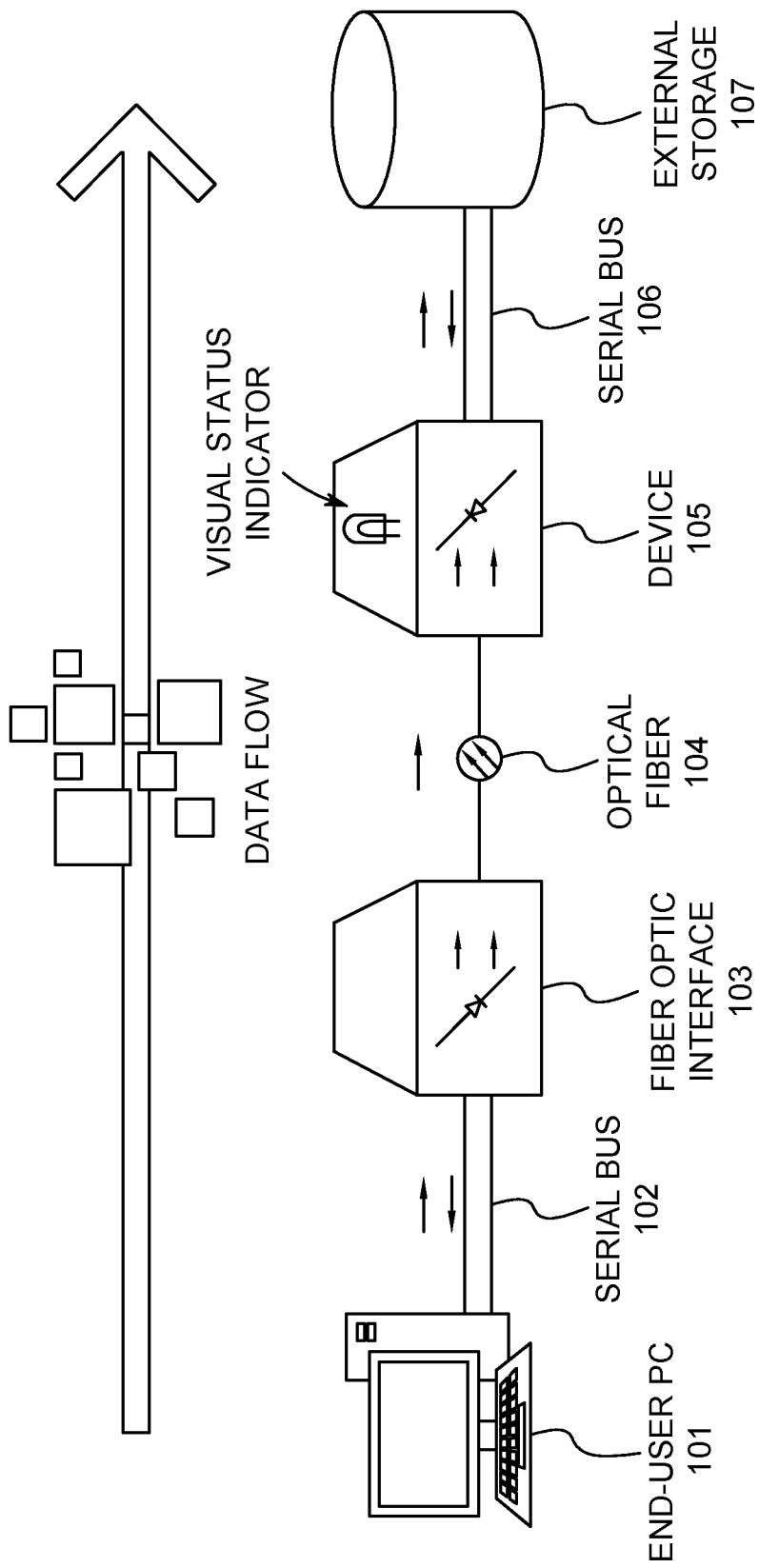
Figure 2:
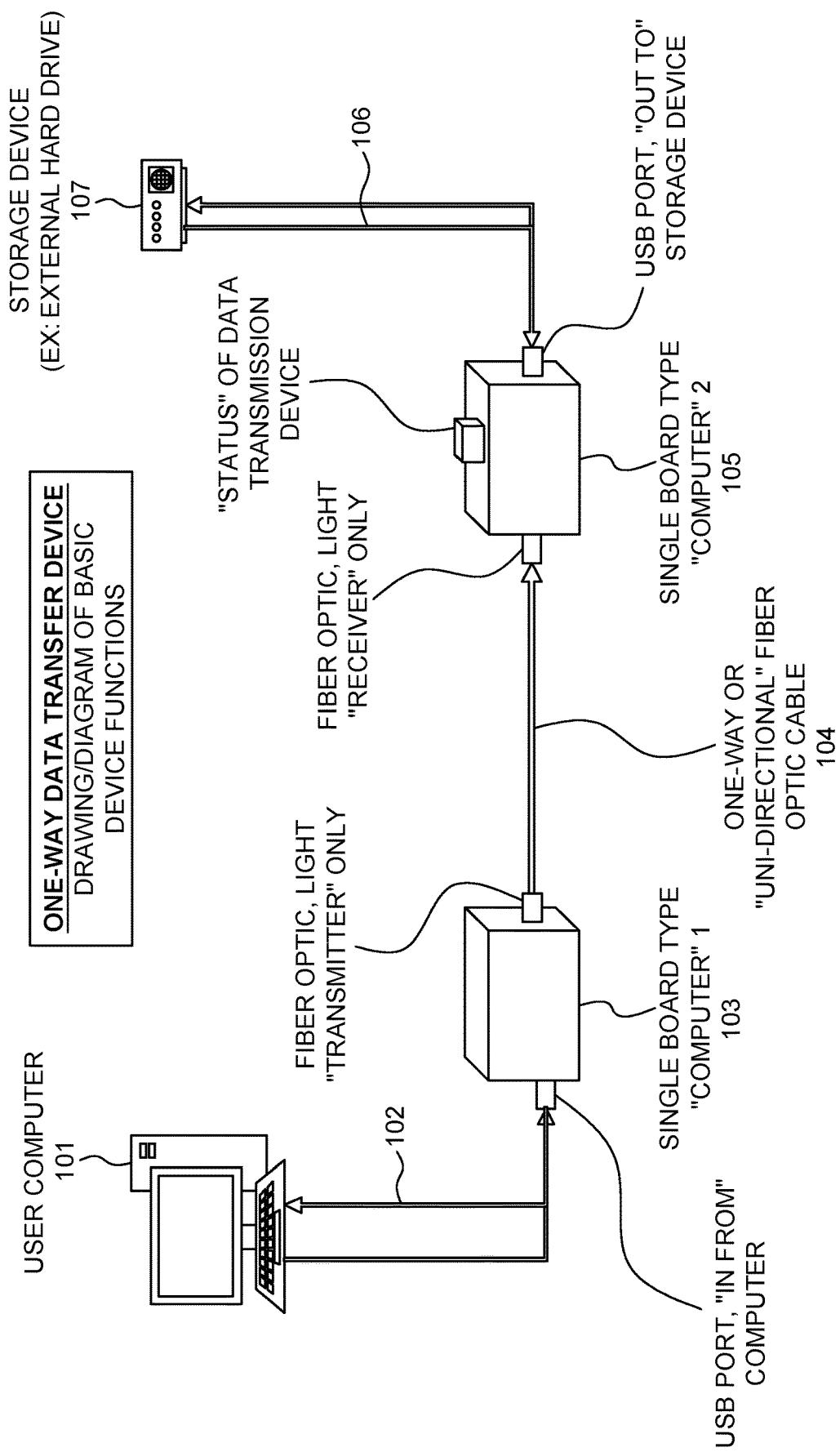
Figure 3:
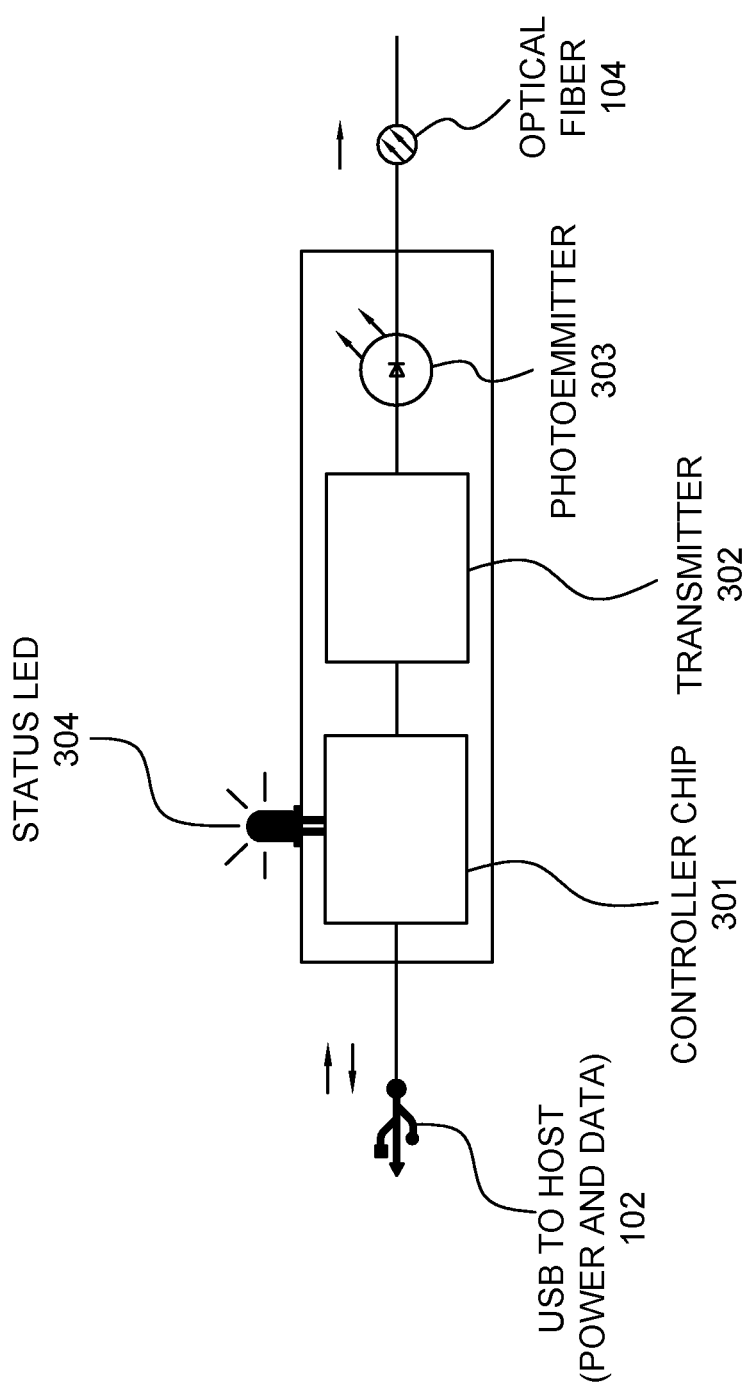
Figure 4:
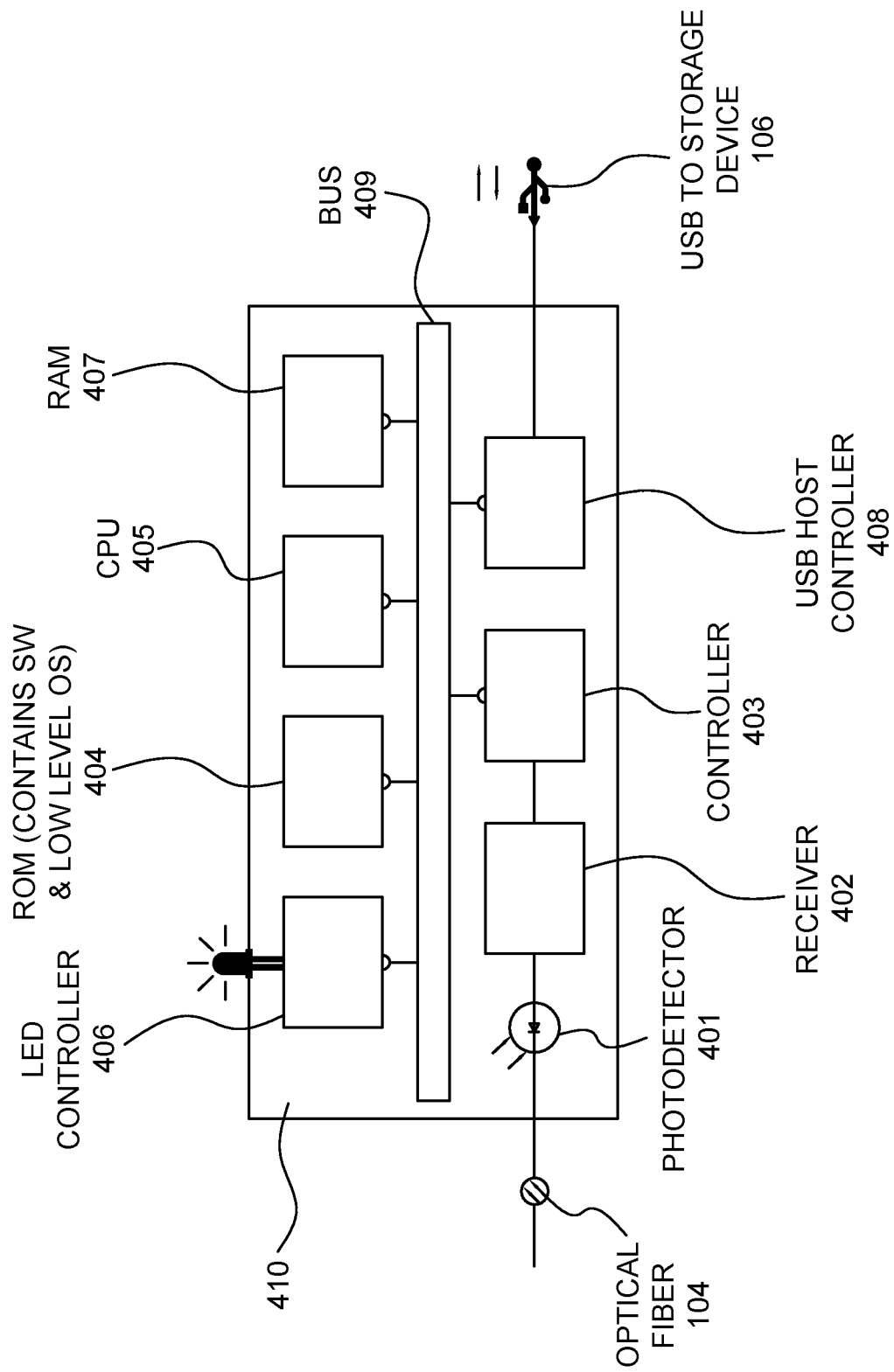

FIG. 1 shows a block diagram of an embodiment of the invention data flow;

FIG. 2 shows a block diagram of an embodiment of the invention;

FIG. 3 shows a block diagram of an embodiment of the first processing device;

FIG. 4 shows a block diagram of an embodiment of the second processing device;

DESCRIPTION

In the Summary above and in the Description, and the claims below, and in the accompanying drawings, reference is made to particular features [including method steps] of the invention. It is so understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

Where reference is made herein to a method comprising two or more defined steps, the defined steps can be carried out in any order or simultaneously (except where the context excludes that possibility), and the method can include one or more other steps which are carried out before any of the defined steps (except where the context excludes that possibility).

The term "at least" followed by a number is used herein to denote the start of a range beginning with that number (which may be a range having an upper limit or no upper limit, depending on the variable being defined}. For example "at least 1" means 1 or more than 1. The term "at most" followed by a number is used herein to denote the end of a range ending with that number (which may be a range having 1 or 0 as its lower limit, or a range having no lower limit, depending upon the variable then being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm.

As shown in FIG. 1 and FIG. 2, block diagrams an embodiment of the invention. A user or software program enters information on a general purpose computer 101. The information from the general purpose computer is sent via a bi-directional link 102, to a first processing device 103. The first processing device 103 is connected via a unidirectional link 104 to a second processing device 105, information received from the general purpose computer 101 is transmitted to the second processing device 105, from the first processing device 103 over the unidirectional link 104. In additional to the information being sent to the second processing device 105, a first hash is generated by analyzing the information which was to be transmitted, by either the first processing device 103, or by the general purpose computer 101. The first hash is transmitted to the second processing device 105, either through the first processing device 103 by the general purpose computer 101, or directly by the first processing device 103. Upon receipt of the first hash by the second processing device 105, a second hash is generated by the second processing device 105. The second hash is compared to the first hash and the second processing device indicates if the first hash and second hash match through one of several different potential display devices.

As shown in FIG. 3, a block diagram of an embodiment of the first processing device, information is received through a Universal Serial Bus connection 102. The information is processed by a controller chip 301 and is then transmitted using a fiber optic transmitter device 302. The fiber optic transmitter device 302 is electrically connected to optical emitter 303. The optical emitter 303 is connected through a unidirectional link 104, an optical fiber in this embodiment. A status display 304 is electrically connected to the controller chip 301. The status display 304 can be one of several different potential display devices and is used to alert a user of any issues detected.

As shown in FIG. 4, a block diagram of an embodiment of the second processing device, information is received through a unidirectional link 104, an optical fiber in this embodiment. The unidirectional link 104 is connected to an optical detector 401. The optical detector 401 is electrically connected to a receiver fiber optic receiver 402 which is in turn electrically connected to a controller 403. The controller 403 processes information transmitted through the optical fiber 104 which is then decoded by the receiver 402. The controller 403 is connected to a read only memory device 404, a central processing unit 405, a display controller 406, random access memory 407, and a Universal Serial Bus Host Controller 408 which are all connected bi-directionally to each other via a communications bus 409. The Central Processing Unit 405 processes program information which is stored on the read only memory 404, in alternative embodiments the read only memory is replaced with memory which can be written to in order to facilitate software updates. The Central Processing Unit 405 processes any information received by the controller 403, and sends it to the Universal Serial Device Host Controller 408 wherein it is transmitted via a Universal Serial Bus 106 to a storage device. Information which is received by the Controller 403 and processed by the Central Processing Unit may be stored temporarily to the Random Access Memory 407 if needed. Given the correct criteria, the Central Processing Unit 405 will trigger the display controller 406 to indicate to a user the result of any given file transfer through a display device 410 which is electrically connected to the display controller 406.

In the present disclosure, like reference numbers refer to like elements throughout the drawings, which illustrate various exemplary embodiments of the present invention.

The previously described embodiments of the present invention have many advantages, including the ability to securely transmit data, the ability to verify data transmission without a security risk or with a minimized security risk.

The invention does not require that all of the advantageous features and all the advantages need to be incorporated into every embodiment of the invention.

EMBODIMENTS OF THE PRESENT INVENTION

Although the present invention has been described in considerable detail with reference to certain preferred versions thereof, other versions are possible. For example the general purpose computer connector shown is a USB connector but the connector could easily be any general purpose electronics connector, or the display shown which is a light emitting diode is, could be any display type or technology.

Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features service the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

What is claimed is:

1. A computing system for securely transmitting data which does not allow for unauthorized access without physical control over said computing system and that does not require a return path for data transmission verification, comprising: a first processing device, having a connection which allows for receipt of data from an external source, and a second processing device, said first processing device further comprising a connection to the second processing device which is unidirectional, said first device upon receipt of the data from the external source transmits said data to said second processing device utilizing said unidirectional connection, said first processing device receives information from said external source, said first processing device connects to said second processing device through said unidirectional connection, said external source sends data to said first processing device which in turn sends the information to said second processing device to store the information on a storage device wherein said computing system further comprises a physical interlock which creates a return path for data between said first processing device and said second processing device which allows said second processing device to transmit stored data to said first processing device.

2. The computing system of claim 1 where said computing system further comprises a first hash which is unique with respect to said data, the transmitted data, generated by said first processing device and said hash are transmitted to said second processing device via said unidirectional connection, said second processing device generates a second hash by analyzing the data which is received by the second processing device, the received data, second processing device compares said first hash and said second hash in order to determine if the first hash and the second hash match.

* * * * *